United States Patent
Jantke et al.

(10) Patent No.: US 10,875,878 B2
(45) Date of Patent: Dec. 29, 2020

(54) METHOD FOR PRODUCING 4-(DIALKYLCHLOROSILYL)-BUTYRONITRILE

(71) Applicant: Wacker Chemie AG, Munich (DE)

(72) Inventors: Dominik Jantke, Eching (DE); Juergen Stohrer, Pullach (DE)

(73) Assignee: WACKER CHEMIE AG, Munich (DE)

( * ) Notice: Subject to any disclaimer, the term of this patent is extended or adjusted under 35 U.S.C. 154(b) by 366 days.

(21) Appl. No.: 16/068,032

(22) PCT Filed: Nov. 14, 2016

(86) PCT No.: PCT/EP2016/077591
§ 371 (c)(1),
(2) Date: Jul. 3, 2018

(87) PCT Pub. No.: WO2018/086715
PCT Pub. Date: May 17, 2018

(65) Prior Publication Data
US 2020/0270284 A1    Aug. 27, 2020

(51) Int. Cl.
*C07F 7/14* (2006.01)
(52) U.S. Cl.
CPC .................... *C07F 7/14* (2013.01)
(58) Field of Classification Search
None
See application file for complete search history.

(56) References Cited

U.S. PATENT DOCUMENTS

2014/0356735 A1    12/2014  Pena Hueso et al.

FOREIGN PATENT DOCUMENTS

| EP | 0110370 B1 | 6/1984 |
|----|------------|--------|
| EP | 2221310 B1 | 9/2014 |
| JP | S4933930 B1 | 7/1970 |

OTHER PUBLICATIONS

Wang et al., "Electrostatic-Gated Transport in Chemically Modified Glass Nanopore Electrodes", J. Am. Chem. Soc. 2006, 128, pp. 7679-7686.
Takiguchi et al., Preparation of 1,3-Bis(4-aminobutyl)-1,3-dimethyl-1,3-diphenylsiloxane and Siloxane containing Polyamides, Bulletin of the Chemical Society of Japan, vol. 52 (6), pp. 1871-1872 (1979).
Tianqiao Yong et al.: "Organosilicon compounds containing nitrile and oligo(ethylene oxide) substituents as safe electrolytes for high-voltage lithium-ion batteries", Journal of Power Sources, Elsevier SA, CH, vol. 254 (2014) pp. 29-32.
Tianqiao Yong et al.: "Supporting Information Organosilicon compounds containing nitrile and oligo(ethylene oxide) substituents as safe electrolytes for high-voltage lithium-ion batteries", Journal of Power Sources, Jan. 1, 2014, pp. 1-9.
Takaguchi et al., "Preparation of 1,3-Bis(4-aminobutyl)-1-3-dimethyl-1,3-diphenyl-disiloxane and Siloxane-containing Polyamides", Bulletin of the Chemical Society of Japan (1979) V52 N6 pp. 1871-1872.

*Primary Examiner* — Clinton A Brooks
(74) *Attorney, Agent, or Firm* — Brooks Kushman P.C.

(57) ABSTRACT

4-(dialkylchlorosilyl)butyronitriles are prepared by high yield by reacting a mixture of technical grade allyl cyanide with dialkylchlorosilanes in the presence of a catalyst of transition group 8 of the Periodic Table of the Elements, wherein the reaction is conducted such that a stoichiometric excess of the dialkylchlorosilane is present together with the catalyst in the reaction mixture, into which the allyl cyanide is metered.

7 Claims, No Drawings

METHOD FOR PRODUCING 4-(DIALKYLCHLOROSILYL)-BUTYRONITRILE

CROSS REFERENCE TO RELATED APPLICATIONS

This application is the U.S. National Phase of PCT Appln. No. PCT/EP2016/077591 filed Nov. 14, 2016, the disclosure of which is incorporated in its entirety by reference herein.

BACKGROUND OF THE INVENTION

1. Field of the Invention

The invention relates to a method for preparing 4-(dialkylchlorosilyl)butyronitriles by reacting allyl cyanide with dialkylchlorosilanes.

2. Description of the Related Art 4-(Dialkylchlorosilyl)butyronitriles are used, for example, for the specific functionalization of surfaces, such as described, for example, in Wang et al. "Electrostatic-Gated Transport in Chemically Modified Glass Nanopore Electrodes" (J. Am. Chem. Soc. 2006, 128, 7679-7686). 4-(Dialkylchlorosilyl)-butyronitriles may however also be converted in a further reaction step to the corresponding 4-(dialkylfluorosilyl)butyronitrile. According to US 2014/0356735 A1, these are promising constituents for electrolytes for lithium ion batteries which, in a mixture with the frequently used conductive salt $LiPF_6$ for example, have high thermal stability.

The preparation of 4-(dialkylchlorosilyl)butyronitriles or analogous compounds by hydrosilylation is known.

US 2014/0356735 A1 describes the synthesis of 4-(dimethylchlorosilyl)butyronitrile by hydrosilylation of allyl cyanide with dimethylchlorosilane under platinum catalysis (Karstedt catalyst). For this purpose, allyl cyanide is initially charged together with the catalyst and dimethylchlorosilane is slowly metered in at elevated temperature.

It is observed when carrying out the hydrosilylation according to this prior art using technical grade allyl cyanide that, on metering in the silane, it leads to a color change of the reaction mass from dark yellow to brown and only an incomplete conversion is achieved. The reaction proceeds less well than described in US 2014/0356735 A1 when using technical grade allyl cyanide.

This is problematic for safety reasons since the incomplete reaction leads to a potential accumulation of heat of reaction. In addition to this safety problem and the poor efficiency of the method resulting from the incompleteness of the reaction, this also causes additional complexity in the work-up since unreacted reactants have to be removed from the reaction mixture.

EP 2221310 B1 describes the hydrosilylation of an excess of allyl cyanide with methyldichlorosilane in an autoclave in the presence of a carboxylic acid. Even here, despite the use of a promoter, a quantitative yield is not obtained. In addition, the acid has to be removed during the work-up.

Takiguchi et al., "Preparation of 1,3-Bis(4-aminobutyl)-1,3-dimethyl-1,3-diphenylsiloxane and Siloxane containing Polyamides", Bulletin of the Chemical Society of Japan, Vol. 52 (6), 1871-1872 (1979) describes the hydrosilylation of high-purity allyl cyanide with dimethylchlorosilane under platinum catalysis in a sealed steel bomb at 120° C. without controlling the pressure, wherein the yield is not described in detail. For an analogous product, 3-cyanopropylchloromethylphenylsilane, a yield of 88% is specified after a reaction time of 24 h and fractional distillation. On an industrial scale, however, the use of high-purity allyl cyanide is uneconomical since the removal of the isomeric and similarly boiling crotonitrile (crotonic acid nitrile) is linked to high cost and inconvenience.

The procedure including initially charging all components in a closed system without controlling the pressure building up and the temperature profile is likewise limited to a laboratory scale procedure, scaling up to an industrial scale being difficult. This procedure is therefore not relevant in terms of industrial applicability.

A summary of the known prior art, therefore, is that the known methods for preparing 4-(dialkylchlorosilyl)butyronitriles industrially are only achievable with difficulty owing to deactivation of the catalyst system, especially when using not specifically purified allyl cyanide, and incomplete conversion resulting therefrom, but also reaction control not being present when carried out in closed systems.

Owing to the high vapor pressure of dialkylchlorosilanes, the method is usually operated by metered addition of these components. An initial charge of the allyl cyanide and the catalyst is therefore the preferred procedure according to the prior art.

There exists a need for a method, which is industrially achievable, in which the use of technical grade allyl cyanide, namely containing, in particular, crotonitrile, leads to conversions which are as complete as possible, and which permits a controllable reaction regime.

SUMMARY OF THE INVENTION

The invention relates to a method for preparing 4-(dialkylchlorosilyl)butyronitriles by reacting a mixture of allyl cyanide T, which has a technical grade purity, with dialkylchlorosilanes in the presence of a catalyst of transition group 8 of the Periodic Table of the Elements, wherein the reaction is conducted such that in the presence of the catalyst in the reaction mixture a stoichiometric excess of the dialkylchlorosilane used is present and the allyl cyanide T is metered in.

DETAILED DESCRIPTION OF THE PREFERRED EMBODIMENTS

In the context of this invention, allyl cyanide T, which has a technical grade purity, is understood to mean a technical grade allyl cyanide which has impurities, for example, as a result of manufacture. In particular, allyl cyanide T is a mixture of 100 parts by weight allyl cyanide and 0.01 to 5 parts by weight, preferably 0.02 to 3.0 parts by weight, especially 0.05 to 1.5 parts by weight, crotonitrileOF. As a result of manufacture, still further impurities may also be present at less than 2 parts by weight, preferably less than 1 part by weight, and in particular less than 0.1 part by weight.

Further components are, for example, hydrocyanic acid, allyl alcohol, allyl chloride, and water.

Crotonitrile is understood to mean the sum of the cis-crotonitrile and trans-crotonitrile isomers.

The mixture preferably comprises at most 0.1 part by weight HCN, more preferably at most 0.01 part by weight HCN.

It has been found that, surprisingly, a complete conversion of the allyl cyanide T is obtained when, in the presence of the catalyst, an excess of the dialkylchlorosilane is present compared to the allyl cyanide and the allyl cyanide T is metered in during the reaction.

As a result, deactivation of the catalyst is avoided and a complete conversion is obtained and also a permanent reaction control is ensured.

Since the conversion is complete, the safety of the method is increased in that an accumulation of unreacted starting materials is prevented.

4-(Dialkylchlorosilyl)butyronitriles are obtained as products. Low amounts of the isomeric products, namely 3-(dialkylchlorosilyl)butyronitriles, are also obtained. Preferably less than 10%, more preferably less than 5% and most preferably less than 3% of 3-(dialkylchlorosilyl)butyronitriles are obtained, based on the sum of the reaction products 4-(dialkylchlorosilyl)butyronitriles and 3-(dialkylchlorosilyl)butyronitriles.

In the case of a discontinuous method, the dialkylchlorosilane, optionally comprising the catalyst, is preferably initially charged. The dialkylchlorosilane may also be initially charged and the catalyst and the allyl cyanide T sequentially added. The allyl cyanide T is added to the reaction mass. As a consequence, the concentration of free allyl cyanide in the reaction solution is as minimal as possible at each time point. A stoichiometric excess of dialkylchlorosilane is used, based on the total amount of allyl cyanide to be reacted. The heat of reaction that occurs may be controlled by the addition of the allyl cyanide T.

In a continuous method, it is preferable to proceed such that all components are added in parallel, wherein the dialkylchlorosilane is always present in excess. A mixture of the dialkylchlorosilane and the catalyst may also be added. The addition is controlled such that, in the presence of the catalyst, an excess of the dialkylchlorosilane is always present. The heat of reaction that occurs may be controlled by controlling the metered addition of the components, especially of the allyl cyanide T.

Examples of the alkyl radicals in the dialkylchlorosilane and 4-(dialkylchlorosilyl)butyronitrile are the methyl, ethyl, n-propyl, isopropyl, 1-n-butyl, 2-n-butyl, isobutyl, tert-butyl, n-pentyl, isopentyl, neopentyl or tert-pentyl radicals; hexyl radicals such as the n-hexyl radical; heptyl radicals such as the n-heptyl radical; octyl radicals such as the n-octyl radical, isooctyl radicals, and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals. Preference is given to linear alkyl radicals having 1 to 6 carbon atoms. Particular preference is given to methyl, ethyl, and n-propyl radicals. The alkyl radical is most preferably a methyl radical. In particular, dimethylchlorosilane is used.

In the method, a catalyst of transition group 8 of the Periodic Table of the Elements or a mixture of two or more catalysts may be used. The elements or compounds of the elements may be used.

Transition group 8 of the Periodic Table of the Elements comprises the elements Fe, Ru, Os, Co, Rh, Ir, Ni, Pd and Pt. Preference is given to using Ir, Ni, Pd and Pt.

Particular preference is given to using platinum and compounds thereof as a catalyst. Platinum catalysts may be used which also have been used previously for the addition of hydrogen atoms bonded directly to Si atoms to aliphatically unsaturated compounds. Examples of catalysts of this kind are metallic and finely-divided platinum which may be situated on supports such as silicon dioxide, aluminum oxide or activated carbon, compounds or complexes of platinum such as platinum halides, e.g. $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-cyclopropane complex of the formula $(PtCl_2C_3H_6)_2$, platinum-vinylsiloxane complexes, particularly platinum-divinyltetramethyldisiloxane complexes with or without content of detectable inorganically bound halogen, bis(gamma-picoline) platinum dichloride, trimethylenedipyridineplatinum dichloride, dicyclopentadieneplatinum dichloride, dimethylsulfoxideethyleneplatinum(II) dichloride and also reaction products of platinum tetrachloride with olefin and primary amine or secondary amine or primary and secondary amine, such as the reaction product of platinum tetrachloride dissolved in 1-octene with sec-butylamine, or ammonium-platinum complexes according to EP 110370 B1.

Particular preference is given to Karstedt catalyst (platinum(0)-1,3-divinyl-1,1,3,3-tetramethyldisiloxane complex) and platinum(IV)-dodecene chloride complex in dodecene.

For 1 mol of allyl cyanide, 1 to 10,000 μmol, more preferably 10 to 1000 μmol, and especially 30 to 150 μmol of metal of transition group 8 of the Periodic Table of the Elements are preferably used.

Preferably, 1.01 mol to 2 mol of dialkylchlorosilane, more preferably 1.05 mol to 1.5 mol of dialkylchlorosilane, and especially 1.1 mol to 1.3 mol of dialkylchlorosilane are used per mol of allyl cyanide, based in each case on the total amount of allyl cyanide to be reacted.

In the reaction or during the work-up, it is possible to use further components, solvents for example. Preferably no further components are used. In the case that these are used, however, they are used in amounts of at most 200%, preferably at most 100%, based on the total reaction mass. Examples of such solvents are aprotic solvents, preferably linear or cyclic, saturated or unsaturated hydrocarbons, e.g. pentane, cyclohexane, toluene, ethers such as methyl tert-butyl ether, anisole, tetrahydrofuran or dioxane, halohydrocarbons such as dichloromethane, 1,2-dichloroethane or chlorobenzene, nitriles such as acetonitrile or propionitrile, or DMSO.

The reaction is preferably conducted at temperatures of 0 to 180° C., more preferably 50 to 150° C., and especially 60 to 120° C., and preferably at pressures of 800 mbar to 16 bar, more preferably 1 to 10 bar, and especially at pressures of 2 to 8 bar.

The reaction times in the discontinuous reaction or the residence times of the components in the continuous reaction are preferably 1 min to 8 hours, more preferably 5 min to 4 hours.

All symbols above of the aforementioned formulae each have their meanings independently of one another. In all formulae, the silicon atom is tetravalent. The sum total of all the constituents of the reaction mixture add up to 100% by weight.

In the following examples, unless stated otherwise in each case, all amounts and percentages are based on weight.

Examples for the Preparation of 4-(chlorodimethylsilyl)butyronitrile

Comparative Example 1 (Non-Inventive): Allyl Cyanide Initial Charge, Open Vessel Weighings:
9.9 g of allyl cyanide (comprising 1.5% crotonitrile)= 147.6 mmol 15.4 g of dimethylchlorosilane=162.3 mmol (1.1 eq)
0.087 g (100 μl) of Karstedt catalyst solution (platinum(0)-1,3-divinyl-1,1,3,3-tetramethyldisiloxane complex, 2.1-2.4% by weight solution in xylene)

Procedure:

The allyl cyanide was initially charged under a protective gas atmosphere in a 100 ml three-necked flask equipped with a reflux condenser, the Karstedt catalyst was added and the mixture was heated to 115° C.

Dimethylchlorosilane was slowly added dropwise with stirring at 115° C. over a period of 6 hours. It was observed in this case that under continuous addition of the dimethylchlorosilane the reaction temperature decreased continuously down to 52° C. (boiling point of the dimethylchlorosilane) since from a certain point no further reaction took place due to catalyst deactivation. The resulting yellowish to brown-colored product was characterized by 1H NMR spectroscopy (Bruker Avance 500, solvent: C6D6). The conversion based on allyl cyanide was 11%.

Example 2-5: Hydrosilylation as a Function of the Crotonitrile Content

Procedure:

In a laboratory autoclave (manufacturer: Berghof; model: BR-100) equipped with a metering pump (manufacturer: LEWA; model: MAH micro-metering pump) was initially charged dimethylchlorosilane (0.54 mol), and a platinum-dodecene chloride catalyst (reaction product of platinum (IV) chloride with dodecene, 4.1% by weight Pt in dodecene), 35 μmol, 78 ppm based on allyl nitrile, was added. The mixture was heated to 80° C. and a positive pressure of 4 bar was set. The mixture comprising allyl cyanide (0.45 mol) was then metered in over a period of 30 minutes whereupon both temperature and pressure increased. At the end of the addition, the mixture was stirred at 100° C. for a further 60 minutes and then cooled. The autoclave was depressurized, opened and the resulting product characterized by 1H NMR spectroscopy (Bruker Avance 500, solvent: CDCl3). The respective crotonitrile content and the maximum positive pressures and temperatures reached and also the resulting yields and the composition of the product are reported in Table 1.

TABLE 1

Hydrosilylation as a function of the crotonitrile content

| | Crotonitrile | pmax | Tmax | Conversion | Product | Isomer |
|---|---|---|---|---|---|---|
| Ex 2 | 0.01% | 6.4 bar | 115° C. | quant. | 97.8% | 2.2% |
| Ex 3 | 1.5% | 4.7 bar | 126° C. | 99.9% | 97.8% | 2.1% |
| Ex 4 | 2.2% | 6 bar | 121° C. | 91.5% | 89.6% | 1.9% |
| Ex 5 | 3.5% | 5.8 bar | 125° C. | 88.9% | 86.9% | 2.0% |

Product: 4-(chlorodimethylsilyl)butyronitrile
Isomer: 3-(chlorodimethylsilyl)butyronitrile

Example 6: Control of the Heat of Reaction by Metered Addition

Dimethylchlorosilane (0.54 mol) and the platinum-dodecene chloride catalyst (reaction product of platinum(IV) chloride with dodecene, 4.1% by weight in dodecene), 35 μmol, 78 ppm based on allyl cyanide, were initially charged in a laboratory autoclave (see Ex 2-5), the autoclave was sealed and heated to 80° C., and a positive pressure of 4 bar was set. Subsequently, allyl cyanide comprising 1.5% crotonitrile (analogous to Ex 3) was metered in over 50 minutes, wherein the temperature was established by way of the addition rate such that the temperature did not exceed 100° C. and was kept constant. The maximum positive pressure was 5.6 bar. At the end of the metered addition, the mixture was further reacted at 100° C. for 1 h and then cooled. The autoclave was depressurized, opened and the resulting product characterized. Quantitative conversion was achieved; allyl cyanide was no longer able to be detected by NMR spectroscopy (Bruker Avance 500, solvent: CDCl3). 97.8% 4-(chlorodimethylsilyl)butyronitrile and 2.2% of the isomeric product 3-(chlorodimethylsilyl)butyronitrile were obtained.

The invention claimed is:

1. A method for preparing 4-(dialkylchlorosilyl)butyronitriles, comprising:
reacting a mixture of technical grade allyl cyanide comprises 100 parts by weight allyl cyanide and 0.01 to 5 parts by weight crotonitrile, with dialkylchlorosilanes in the presence of a catalyst of transition group 8 of the Periodic Table of the Elements, wherein the reaction is conducted such that a stoichiometric excess of the dialkylchlorosilane is present in a reaction mixture with the catalyst, and the technical grade allyl cyanide is metered into the reaction mixture and wherein the alkyl radicals in the dialkylchlorosilane are alkyl radicals having 1 to 6 carbon atoms.

2. The method of claim 1, which is carried out discontinuously in a reactor and the dialkylchlorosilane is initially charged to the reactor.

3. The method of claim 1, which is carried out continuously, and the dialkylchlorosilane(s), technical grade allyl cyanide, and catalyst are added in parallel, wherein the dialkylchlorosilane is always present in excess.

4. The method of claim 3, wherein catalyst is supplied dissolved in dialkylchlorosilane.

5. The method of claim 1, in which the dialkylchlorosilane is dimethylchlorosilane.

6. The method of claim 1, in which the catalyst is selected from platinum, compounds thereof, and mixtures thereof.

7. The method of claim 1, in which, for 1 mol of allyl cyanide, 1 to 10,000 μmol of metal of transition group 8 of the Periodic Table of the Elements are present as the catalyst.

* * * * *